United States Patent

Chen et al.

[15] 3,656,003

[45] Apr. 11, 1972

[54] SENSE AMPLIFIER FOR COMPUTER MEMORY OPERATING UNDER HIGH SPEED CYCLE TIMES

[72] Inventors: Chung-Ho Chen, Plymouth Meeting, Pa.; Roy D. Thomas, Wenonah, N.J.

[73] Assignee: Sperry Rand Corporation, New York, N.Y.

[22] Filed: July 10, 1970

[21] Appl. No.: 53,743

[52] U.S. Cl. ..............................307/238, 307/235, 307/237, 328/146, 330/69, 340/174

[51] Int. Cl. ..........................................H03k 5/20, H03k 5/08

[58] Field of Search ..........................307/237, 238, 235, 300; 328/150, 146; 330/30 D, 69, 38 M; 340/174

[56] References Cited

UNITED STATES PATENTS 3,355,723 11/1967 Clark .....................................307/238
3,090,000 5/1963 Bentley..................................307/235
3,466,551 9/1969 Vaughn ................................328/146

OTHER PUBLICATIONS

Electronics, Nov. 11, 1968, p. 121

*Primary Examiner*—Donald D. Forrer
*Assistant Examiner*—David M. Carter
*Attorney*—Charles C. English, Rene A. Kuypers and William E. Cleaver

[57] ABSTRACT

This invention relates to a sense amplifier circuit for use with a memory element of a high speed computer which does not become saturated during its write cycle by high frequency transient noises. Low frequency noises generated during the computer write cycle are also rejected during an immediately following read cycle so that memory output is passed through the amplifier. In addition, the sense amplifier arrangement includes circuitry whereby the write (i.e., bit) current driving voltage for recording information into the memory is substantially reduced.

10 Claims, 2 Drawing Figures

INVENTORS
CHUNG-HO CHEN
ROY D. THOMAS
BY Rene A. Kuypers
ATTORNEY

SENSE AMPLIFIER FOR COMPUTER MEMORY OPERATING UNDER HIGH SPEED CYCLE TIMES

BACKGROUND OF THE INVENTION

This invention is related in general to the field of electronic amplifiers and in particular to the field of amplifiers for use with computer memory elements which operate in a high speed mode (e.g., $10^{-9}$ second).

In the digital computer art either past or present and predictably the future, the trend has been to increase its operating speed. This trend is understandable since the faster a computer can execute its instructional program the greater will be its productive output in a given time period and therefore the lower will be its computing cost.

One of the areas of hardware which must perform faster to achieve the above stated speed performance is the memory of the computer. Thus in order to achieve faster computing speeds, the read and write cycle time of the memory must correspondingly become faster. The cycle time of a computer memory is defined as the minimum time interval between the starts of successive accesses to a memory or a storage location.

Referring now in particular to the art of plated wire memory elements, it is recognized that such a memory element can be switched in about 15 nanoseconds (billionths of a second). However, the known prior art sense amplifiers connected to such rapid switching memory elements for detecting their stored information has not been entirely satisfactory.

One of the shortcomings of the said known prior art sense amplifiers used with plated wire memory elements has been that noise transients developed during the memory write cycle have tended to saturate the amplifier so that it is not conditioned to detect a signal from memory during an immediately following read cycle. Under the last stated occurrence, the amplifier must first settle down and become unsaturated before it is ready to detect information. In other words, the worst case situation has been a memory write cycle immediately preceding a read cycle and the prior art sense amplifiers have not been able to handle this worst case under fast cycle times. From the above, it can be appreciated that if the prior art sense amplifier must first settle down from its saturated condition which occurs during a write cycle before a next following read cycle can be performed, then valuable computing time is being lost.

Another shortcoming of known prior art sense amplifiers has been that noise which is developed in the memory plane during the write cycle (identified as "bit recovery noise") must also die down before a read cycle can follow a write cycle. Bit recovery noise is normally developed in the memory ground plane and is caused by eddy currents induced in the plane. As a result of the these eddy currents there is a very slow changing field present. This change in the magnetic field will induce a small voltage in the memory sensing line even after the bit current is turned off upon the completion of a write cycle. Known prior art sensing amplifiers have been unsatisfactory from the point of view that they have not been able to isolate the plated wire output signal from this bit recovery noise. Therefore, this shortcoming of known prior art sense amplifiers has also tended to lengthen the cycle time of the memory during a worst case condition since it is required that this noise die down.

Another recognized shortcoming of prior art plated wire memory planes in general has been that the driving voltage source for supplying bit current to the plated wire during a memory write cycle has been too high so that the transistors comprising the voltage driving source have been operated near their maximum ratings. Under these conditions it is possible to break down the transistors. Prior known sense amplifiers have not been able to provide any relief from this particular situation.

SUMMARY OF THE INVENTION

The sensing circuit is essentially composed of a clamping circuit connected to the input of a first differential amplifier. The output of the first differential amplifier is connected to a restoring circuit which in turn is connected to a second differential amplifier. In addition to the above-mentioned circuitry, a splitter circuit is connected to the input of the clamping circuit.

The splitter circuit connected to the input of the sense amplifier circuitry is utilized in order to divide the bit current with a minimum voltage drop. This therefore minimizes the bit current driving voltage.

The bit current applied to the splitter circuit above discussed is also simultaneously applied to the clamping circuit at the input of the first differential amplifier. The clamping circuit prevents write noise from the bit driver circuit from appearing at the sense amplifier output (i.e., the second differential amplifier).

The restore circuit separates the bit recovery noise due to eddy current effects, which is essentially a low frequency signal, from the memory read-out signal, which is a high frequency signal. Accordingly, the memory read-out signal is passed through to the second differential amplifier output with the bit recovery noise signal fully attenuated.

As can be appreciated, a read cycle is capable of following a write cycle much more rapidly in the instant invention, since although there is transient and bit recovery noise still present in the sensing circuitry, nevertheless, it can be operated under rapid cycling conditions because the noise will be attenuated.

It is therefore an object of this invention to provide a new and improved amplifier circuit.

It is still a further object of this invention to provide a new and improved sense amplifier for use with computer memory elements.

It is yet another object of this invention to provide a new and improved sense amplifier for use with plated wire memory elements.

It is nevertheless another object of this invention to provide a new and improved sense amplifier for use with high speed computer memories which can operate with faster read and write cycle times.

DESCRIPTION OF THE PREFERRED EMBODIMENTS

Figure 1:
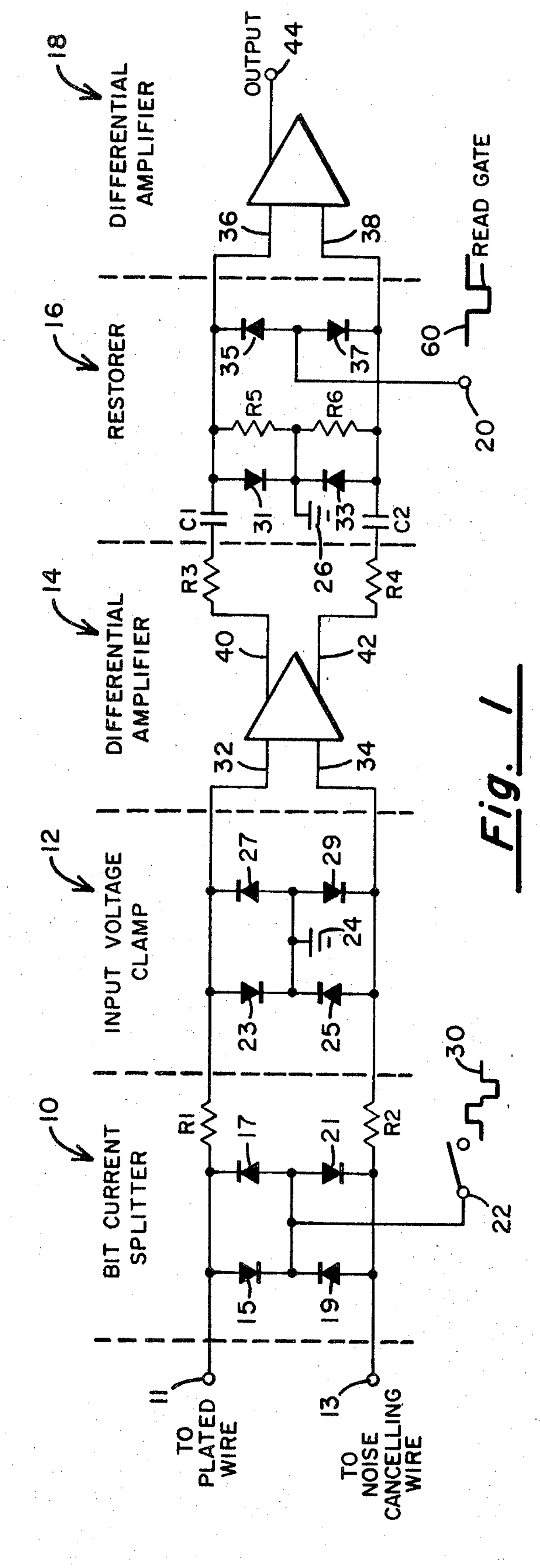
FIG. 1 depicts the essential circuit arrangement of the sensing amplifier used with a computer memory element operating under high speed write and read cycle times.

Referring now to FIG. 1 in greater detail, there is depicted the sense amplifier circuit of this invention which is comprised of a diode bit current splitter 10, a diode voltage clamp 12, a first differential amplifier 14, a diode restorer 16 and a second differential amplifier 18. The input terminal 11 of the sense amplifier circuitry is connected to a plated wire memory element (not shown). The second input terminal 13 is connected to a noise cancelling wire (not shown). The plated wire and noise cancelling wire are not shown for ease of understanding, but nevertheless the cooperation of these elements in conjunction with a word driver may be more fully understood and appreciated by referring to patent U.S. Pat. No. 3,465,312 in behalf of C. A. Nelson. In the just-mentioned patent the dummy wire is equivalent to the noise cancelling wire.

Considering now the sense amplifier circuit in its quiescent state, the switch 22 (a bit driver switch) is opened and therefore the bi-polar bit current 30 is not applied. The bi-polar bit current 30 is utilized to write binary information into the plated wire connected to the terminal 11. This aspect of the invention will not be gone into great detail but may be reviewed by referring to patent U.S. Pat. No. 3,500,351 in the name of E.N. Schwartz. With the switch 22 open, both the plated wire connected to terminal 11 and the noise cancelling wire connected to the terminal 13 are at ground potential. Furthermore since the pulse 30 is not applied, none of the diodes in the splitter circuit 10 and clamp circuit 12 are forward biased and therefore are in a non-conducting state. Accordingly, the inputs 32 and 34 of amplifier 14 are also at ground potential since the circuit path from terminals 11–13 to the inputs 32–34 of amplifier 14 is via the resistors R1, R2. The amplifier 14 is now deemed to be in a standby condition.

The outputs 40 and 42 of amplifier 14 are also at A. C. ground potential (i.e., no signal output) since the function of a differential amplifier is to take the algebraic sum of its input signals and produce the sum on the output terminals 40 and 42. The signal on terminal 40 is 180° out of phase with the signal produced on output terminal 42. Since the input terminals 32 and 34 are both at ground or zero volts, the signal produced at the output terminals 40 and 42 is also zero.

In the quiescent state a voltage 60 is applied to terminal 20 and is of a positive polarity. In the quiescent state, the amplifier is in a standby condition which means that the circuit is not being used. Accordingly, a current flows from terminal 20 through the diode pair 37 and 33 to the ground terminal 26. Furthermore, current flows from terminal 20 through the diode pairs 35 and 31 to the ground terminal 26. In addition to the above described circuit path, a small current flows from the terminal 20 through the diode 35 and the resistor R5 to the ground terminal 26. A similar small current flows from the terminal 20 through the diode 37 and the resistor R6 to terminal 26. The current through the circuit path including the resistor is smaller in magnitude than the current flowing through the circuit path including the diodes alone. This is a result of the fact that the resistance of the resistance-diode path is greater than that of the diode-diode path.

Figure 2:
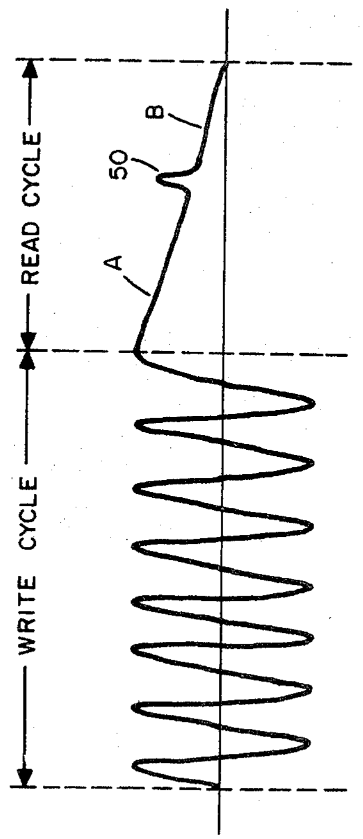
FIG. 2 depicts in pictorial form the types of noise encountered by a sensing amplifier used with a plated wire memory element.

The operation of the sense amplifier of FIG. 1 will now be reviewed with respect to a worst case situation which is write cycle immediately followed by a read cycle. This worst case situation is depicted in FIG. 2. During the write cycle, the switch 22 is closed and the pulse 30 is applied simultaneously to the plated wire and the noise cancelling wire connected to the terminals 11 and 13, respectively. Current flow is produced in the plated wire and noise cancelling wire by forward biasing certain diode pairs of the splitter circuit 10.

Thus, when the bi-polar bit current voltage source (not shown) goes positive, the diode pair 17 and 21 are forward biased since the cathodes of these diodes are connected to ground at the ends of the plated and noise cancelling wires, (i.e., the ends not connected to terminals 11 and 13). The diode pairs 15 and 19 become forward biased when the bit current source goes negative. Therefore, the conducting diode pairs (i.e., diodes 17 and 21 or diodes 15 and 19) splits the positive or negative bit current 30 between the plated wire and the noise cancelling wire. This is accomplished with minimum voltage drop since the drop across a diode is only 0.7 volts. Since the voltage drops across the respective diodes of the diode pairs are only 0.7 of a volt, the source generating the bit current may operate at a lower voltage level. In other words, in view of the low voltage drop diode used in the splitter circuit the voltage source need not produce such a high voltage output. This is significant since the transistors required to provide the source driving voltage for generating the current pulse 30 can operate at a lower level and therefore, the transistors will not be operating near their maximum ratings. It should be understood that when a transistor or any electronic device is operating near its maximum rating, there is likelihood that it could possibly break down and therefore become inoperative. The voltage source which provides the bit current 30 applies a voltage of 3 volts to the respective terminals 11 and 13.

While bit current is flowing through the diode pairs in the splitter circuit 10 another current path is also being simultaneously established in certain diodes of the voltage clamp circuit 12. This current flow is established by the fact that when the voltage source which provides the bit current 30 goes positive, a current path is established through the diode pairs 21 and 25 to ground 24 via resistor R2. Similarly, current flows through diode 17 to the ground terminal 24 via the resistor R1 and the diode 23. When the bit current source goes negative, current flows simultaneously from the ground terminal 24 through the diode 29, the diode 19 and the resistor R2 to the switch 22 and returns to the grounded voltage source. Similarly, current flows from the ground terminal 24 through the diodes 27 and 15 as well as resistor R1 to the switch 22 and finally to the voltage source. In view of the fact that the diode pair 27 and 29 as well as the diode pair 23 and 25 are matched to one another, the voltage drop across each one is equal to one another and is approximately 0.4 volts. The diodes used in the clamp circuit 12 are low voltage drop elements.

From the above it can be seen that the diodes comprising the voltage clamp circuit 12 are turned-on automatically by the bit current 30 being applied to terminal 22. The automatic turn-on of the diodes of the clamping circuit 12 prevents high frequency bit transient noise from appearing at the sense amplifier output as will be explained in greater detail hereinafter.

The bit write noise as viewed in FIG. 2 is primarily caused during time period that the bi-polar bit current 30 is being applied. This transient noise is produced by the fact that energy is being applied to a magnetic system. Part of this energy is used to charge up the distributed capacitance and inductance which is present along the plated wire connected to terminal 11 and the noise cancelling wire connected to terminal 13. The charging of the distributed capacitance and the distributed inductance along the plated wire and the noise cancelling wire form a random noise signal while the bit current is being applied. A form of this noise is shown during the write cycle section for explanatory purposes only in FIG. 2. In other words, the noise shown in the write cycle of FIG. 2 is the random noise signal while the pulse 30 is being applied. In the present embodiment, this noise signal has a peak to peak amplitude of approximately 30 millivolts. It is this noise signal or transient which if allowed to appear at the input terminals 32 and 34 of the amplifier 14 would saturate it. It can be appreciated that if amplifier 14 becomes saturated by a noise signal, it would not be in a condition to sense a signal from the plated wire when it is required to read out information stored thereon during an immediately following memory read cycle. It is the function of the clamping circuit 12 to minimize or eliminate this problem.

This is accomplished in the following way. It will be recalled that the 3 volt signal applied from the voltage source connected to terminal 22 forward biases certain of the diode pairs of clamp circuit 12. When the bit current signal 30 applied to the plated wire and the noise cancelling wire is of a positive nature, the diodes 23 and 25 are utilized to clamp the signal to the ground via terminal 24. By clamping the positive excursions to ground means that terminal 32 is fixed to ground and cannot rise to any voltage above that required to forward bias the diode. Thus, the signal applied to the input terminals 32 and 34 is just slightly above ground. Similarly, when the bit current signal 30 goes negative, the diodes 27 and 29 are forward biased so that the input terminals 32 and 34 are slightly below ground. Therefore, since the voltage source connected to terminal 22 will cause some combination of diode pairs (either diodes 23–25 or diodes 27–29) to conduct it is clear that the random noise signal appearing at the inputs 32–34 will be near ground potential. In actual practice the signal at input terminals 32–34 is approximately 0.4 volts. The common mode signal is sufficiently low so that the amplifier 14 does not become saturated. The common mode signal is reduced in amplitude by the differential amplifier action of amplifier 14 so that little if any noise appears at the output terminals 40, 42. Any differential noise, however, that does appear at the output terminals 40–42 is virtually eliminated in the manner described below.

During the write cycle at which time the pulse 30 is being generated and applied to switch 22, the standby voltage is applied to terminal 20 and is positive going. This positive going signal functions to forward bias the diodes 35, 37, 31 and 33. In other words, since the anodes of diodes 35 and 37 have a positive voltage applied thereto and the anodes of diodes 31 and 33 are connected to the ground terminal 26, the diodes are all forward biased and current is conducted from terminal 20 through diodes 35 and 31 to ground via terminal 26 as well as through diodes 37 and 33 to ground. An additional current path is also provided from terminal 20 through the diodes 35 and 37 and through the respective resistors R5 and R6 to ground via terminal 26. Since the resistance of resistor R5 is high with respect to the resistance of the conducting diodes 31 and 33, it is readily apparent that most of the current flows through the diode-diode path rather than through the diode-resistor path.

The combination of the capacitor C1 in combination with either diode 31 or resistor R5 comprises a differentiator circuit. A similar circuit arrangement exits between capacitor C2 in conjunction with diode 33 or resistor R6. As stated above, the diodes 31 and 33 are conducting so that in effect a short circuit exists from the respective capacitors to ground. Furthermore, the fact that the diode 31 is in parallel with the resistor R5 and diode 33 is in parallel with resistor R6 makes the diode-resistance combination retain a low value.

Therefore, in the event that any high frequency transient noise is not eliminated by the amplifier 14, the differentiator with the diode conducting acts as a blocking circuit and effectively blocks the high frequency noise including any other noises from reaching the input terminals 36 and 38 of amplifier 18.

This can be appreciated by the fact that the differentiator comprising the capacitor in conjunction with the resistance acts as a voltage divider. The input signal to amplifier 18 is the voltage, for example, from terminal 36 to ground terminal 26. Mathematically, the voltage across the input resistance is approximately $$V_R=\frac{R}{R+X_c} \text{ or } \frac{R}{R+\frac{1}{jwC}}$$

From the above formula it will be recognized that the bit transient noise is effectively eliminated by the fact that the resistance of the conducting diodes 31 and 33 is zero or a substantial short circuit so that $V_R$ is substantially zero. Accordingly, the input voltages applied to terminals 36–38 of amplifier 18 is zero and any bit transient noise that has not been eliminated by the amplifier 14 has been effectively attenuated.

Let us now assume that a read cycle is to immediately follow the write cycle. This timing can be appreciated by referring to FIG. 2. During a memory read cycle, information stored on the plated wire connected to terminal 11 is to be read out of the memory. No information however is read out of the noise cancelling wire connected to terminal 13 since it does not have the ability to store information. This aspect may be studied further by referring to the above-mentioned Nelson patent. For a desired read cycle, the voltage 60 applied to terminal 20 is changed from that of a positive signal to a negative read gate pulse. This causes the diode pairs 33 and 37 as well as the diode pairs 31 and 35 to no longer conduct since they are no longer forward biased. During the first portion of the read cycle as viewed in FIG. 2 it can be seen that after the bit transient noise has terminated another noise A, B appears during the read cycle. This noise is essentially a low frequency noise and is an after effect of the bit current being applied to terminal 22 during a write cycle and carries over into the read cycle.

The noise that occurs during the read cycle is identified as bit recovery noise and is generated by a voltage induced in the plated wire and the noise cancelling wire connected to the terminal 11 and 13, respectively, by eddy currents flowing in a metal ground plane (not shown) and juxtaposed to the wires. The eddy currents themselves originate in the ground planes because of the change in fields produced by the bit current 30 during the write cycle. The metal ground plane has finite conductivity and it takes some time for these currents to decay. During the decay time of this current a small voltage is induced in the plated and noise cancelling wire after the bit current has been terminated. This induced voltage is only on the order of a few millivolts, however, it is in the range of the plated wire output voltage signal 50 (FIG. 2) and therefore it can be difficult for the sense amplifier to distinguish between noise and signal if the former is not substantially reduced in amplitude. If this induced voltage does not decay sufficiently by the time a read-out signal is expected, it limits the maximum speed of the memory. During the read cycle as noted, the switch 22 is opened and no bit current 30 is being applied to the splitter circuit 10. Accordingly, the first portion A of the bit recovery noise before the output signal 50 appears in the read cycle (FIG. 2) and is applied via the resistor R1 to the input terminal 32 of amplifier 14. The input terminal 34 has substantially the same signal applied thereto but differs in amplitude since the cancelling wire is further distant from the wires that have just received the write signal 30. One output 40 of the amplifier 14 is substantially like the signal shown in FIG. 2. The second output signal (not shown) produced at the terminal 42 is 180° out of phase with the signal on terminal 40 and therefore is the mirror image of the figure shown in the read cycle of FIG. 2.

During the read cycle, the switch 22 is opened and the read gate pulse is of a negative polarity. The negative pulse applied to terminal 20 back biases diodes 31, 33, 35 and 37 since their respective cathodes are at ground (due to their connection to terminal 26) and their anodes are connected to the negative signal at terminal 20.

It should be noted above that the read gate pulse generates a common mode noise signal. This noise does not appear at the output 44 since it is common mode at inputs 36, 38 across the junction capacitance of the diodes 35 and 37.

The above described has the effect of changing the time constant of the filter circuit since the differentiator circuit is now composed of C1–R5 and C2–R6. The other words, during the write cycle, the time constant was short because the diodes were conducting, and during the read cycle the time constant is long since the diodes have become non-conducting and the resistors conducting.

Applying the same formula as above, it is noted that for a very low frequency, $V_R$ approaches zero and on the other hand, as the frequency increases, $V_R$ approaches some definite value. Therefore, as the time constant of the RC circuit is increased in the restorer circuit 16, it becomes a high pass filter and thereby effectively blocks a low frequency bit recovery noise. In other words, for a low frequency signal, the voltage across the input terminal $V_R$ is substantially zero whereas for a high frequency signal $V_R$ is not zero. The read out signal 50 is a high frequency signal and passes through to the input terminals 36–38.

Accordingly, the input to input 36 is the read-out memory signal 50 without the low frequency noise signal A, B. Similarly, the input 38 has the mirror image of the signal 50 applied thereto less the low frequency noise signal. Since the amplifier 18 produces the algebraic difference of the inputs 36 and 38, it is seen that the output 44 is twice the amplitude of signal 50 times the gain of the amplifier.

The restorer circuit thereby functions to restore the reference level of signal 50 to signal ground. In other words, as the low frequency noise is blocked by the capacitors $C_1$, $C_2$, the output on the other side of the capacitor goes to ground. The signal 50 which passes through the capacitors $C_1$ and $C_2$ are then referenced to this ground potential.

What is claimed is:

1. A sensing circuit comprising:

a. first and second differential amplifiers;

b. a memory for storing information;

c. means utilized in cooperation with said memory for reading out and writing in information therein;

d. means connected intermediate said first amplifier and said memory as well as said last mentioned means for preventing the saturation of said first amplifier by a high frequency noise signal occurring during said writing in of information into said memory;

e. means further connected intermediate said first and second amplifier for blocking a high frequency noise signal in said writing mode, and a low frequency noise signal in said reading out mode, said means further passing a high frequency read-out signal from said memory to said second amplifier during said second mode of operation.

2. A sensing circuit in accordance with claim 1 wherein said memory comprises a plated wire memory element.

3. A sensing circuit in accordance with claim 2 wherein said means cooperating with said memory comprises a noise cancelling wire.

4. A sensing circuit in accordance with claim 1 wherein a voltage splitter circuit is further connected to the input of said first mentioned intermediate means and said memory.

5. A sensing circuit in accordance wit claim 4 wherein said splitter circuit comprises two pairs of matched diodes.

6. A sensing circuit in accordance with claim 1 wherein said first mentioned intermediate means comprises a signal clamping circuit.

7. A sensing circuit in accordance with claim 6 wherein said clamping circuit is comprised of two diode matched pairs, certain of said diode pairs conducting current during the write mode of said memory.

8. A sensing circuit in accordance with claim 1 wherein said second intermediate connected means comprises a signal blocking means during said write mode and a high pass filter during said read mode.

9. A sensing circuit in accordance with claim 8 wherein said blocking means comprises an RC circuit having a low time constant, and said high pass filter comprises an RC circuit having a higher time constant.

10. A sensing circuit in accordance with claim 1 wherein a voltage restorer circuit is interposed between said differential amplifiers.

* * * * *